(12) United States Patent
Gilmore et al.

(10) Patent No.: US 6,918,937 B2
(45) Date of Patent: Jul. 19, 2005

(54) ABRASIVE POLISHING COMPOSITION (75) Inventors: James Randall Gilmore, Ligonier, PA (US); Lawrence J. Rhoades, Pittsburgh, PA (US)

(73) Assignee: Extrude Hone Corporation, Irwin, PA (US)

( * ) Notice: Subject to any disclaimer, the term of this patent is extended or adjusted under 35 U.S.C. 154(b) by 803 days.

(21) Appl. No.: 09/929,696

(22) Filed: Aug. 14, 2001

(65) Prior Publication Data

US 2002/0007600 A1 Jan. 24, 2002

Related U.S. Application Data (60) Division of application No. 09/376,892, filed on Aug. 18, 1999, now Pat. No. 6,273,787, which is a continuation-in-part of application No. 09/139,642, filed on Aug. 26, 1998, now abandoned.

(51) Int. Cl.$^7$ .............................. C09G 1/02; C09G 1/04
(52) U.S. Cl. .............................. 51/307; 51/308; 51/309; 51/298; 106/3
(58) Field of Search .......................... 51/298, 307, 308, 51/309; 106/3

(56) References Cited

U.S. PATENT DOCUMENTS

| | | | |
|---|---|---|---|
| 1,246,996 A | 11/1917 | Pfeifer | 451/113 |
| 2,883,809 A | 4/1959 | Simjian | 451/113 |
| 3,589,071 A | 6/1971 | Hirschhorn | 451/113 |
| 3,593,410 A | 7/1971 | Taylor | 451/36 |
| 4,821,466 A | 4/1989 | Kato et al. | 451/113 |
| 4,823,513 A | 4/1989 | Marcus et al. | 451/113 |
| 4,936,057 A | * 6/1990 | Rhoades | 451/36 |
| 5,054,247 A | * 10/1991 | Rhoades et al. | 451/36 |
| 5,125,191 A | * 6/1992 | Rhoades | 451/36 |
| 5,271,184 A | 12/1993 | Majors | 451/106 |
| 5,449,313 A | 9/1995 | Kordonsky et al. | 451/106 |
| 5,593,339 A | 1/1997 | Yam et al. | 451/104 |

FOREIGN PATENT DOCUMENTS

| | | | |
|---|---|---|---|
| JP | 5583560 | 6/1980 | 451/104 |
| SU | 585960 | 12/1977 | 451/106 |

* cited by examiner

*Primary Examiner*—Michael A Marcheschi
(74) *Attorney, Agent, or Firm*—The Webb Law Firm, P.C.

(57) ABSTRACT

The present invention is based on the practice of abrasive machining with no sealed working chamber by the employment of a visco-elastic abrasive medium, behaving predominantly as an elastic solid at the applied strain of the orbital working motion, and applying orbital or other relative working motion to produce strain rates which bring the medium into a predominantly elastic deformation and often near, but not to exceed, the compressive stress limit at the strain rate employed. The preferred visco-elastic abrasive medium is a rheopectic poly(boro-siloxane) filled with viscosity increasing stiffening agents and high loadings of the abrasive of choice and relatively mono amounts of plasticizers. The system is operated in an open chamber under applied strain rates such that at least 50%, particularly about 50 to 99%, and preferably about 80 to 95%, of the deflection of the medium under the conditions of operation occurs by elastic deformation and is elastically recovered, and less than 50% particularly about 1 to 50%, preferably about 5 to 20%, of the deflection of the medium occurs by fluid or plastic flow.

3 Claims, 3 Drawing Sheets

ABRASIVE POLISHING COMPOSITION

RELATED APPLICATIONS

This application is a division of U.S. patent application Ser. No. 09/376,892 filed Aug. 18, 1999, now U.S. Pat. No. 6,273,787, which is a continuation in part of U.S. patent application Ser. No. 09/139,642 filed Aug. 26, 1998, now abandoned.

FIELD OF THE INVENTION

The present invention relates to apparatus and methods for performing abrasive work on a work piece using an abrasive visco-elastic medium and, in particular, a apparatus and methods that impart a relative cyclic motion between the work piece and the medium to provide a separation between the medium and work piece during each cycle which separation is occupied by a fluid having a viscosity less than that of the visco-elastic medium and where the deformation of the medium is between 50 and 99%.

BACKGROUND

TECHNICAL FIELD

The present invention relates to the technical field of machining and particularly to the field of non-traditional machining processes and equipment employing the techniques of and compositions for abrasive flow machining, grinding, deburring, radiussing, leveling and polishing of work pieces. Such processes are typically employed in the working of castings, forged parts, machined parts, and the like. Most often metal parts and the like. The present invention particularly relates to such operations where the flow is attained by relative motion, preferably orbital motion, between the work piece and the abrasive medium.

PRIOR ART

Abrasive flow machining has gained wide acceptance for a number of applications as the machining and finishing technique of choice. Such techniques are particularly adapted, for example, to working interior passages in work pieces, for light grinding, deburring, radiussing leveling and polishing of complex surfaces, and particularly three-dimensioned surfaces where surface detail requires working, and in repetitive working of multiple work pieces of complex form and shape.

In its simplest form, abrasive flow machining requires passing a visco-elastic medium containing an abrasive across the surfaces to be worked. The visco-elastic medium functions as a carrier for the abrasive, and transmits working force to the abrasive as the abrasive is carried across the surface. The medium flows to conform to the surface of the work piece.

In many contexts, advantage is taken of the visco-elastic character of the medium to pump the abrasive filled medium through passages, across surfaces, and between a work piece surface and a suitable member to confine the flow and constrain the medium in engagement with the surface of the work piece.

In many contexts, particular advantages are attained when the visco-elastic abrasive medium is also rheopectic, i.e., increasing in apparent viscosity with applied stress. (The behavior of rheopectic materials is, in essence, the converse of thixotropic behavior.) With the appropriate application of stress, typically either shear or compressive stress, to the medium, it is possible to substantially attain plug flow of the medium across the surfaces of the work piece to be worked in the operation. Substantially higher working force is applied to the surface by such plug flow when compared to viscous flow of the medium.

A more detailed description of the basic prior art on orbital abrasive flow polishing and grinding can be found in U.S. Pat. Nos. 3,521,412, 3,634,973, McCarty and U.S. Pat. No. 3,819,343, Rhoades.

One particularly attractive implementation of abrasive flow machining has been the employment of a rheopectic visco-elastic abrasive medium in combination with an orbital drive mechanism, where the medium and a work piece are confined together in a pressurized chamber with a "displacer member" generally conforming to the inverse of the shape of the work piece surfaces to be worked, and where the orbital motion of the work piece relative to the chamber displacer member and the contained medium causes the work piece to be effectively worked. Such operations take advantage of the ability of the medium to conform to the surfaces of the work piece, and even complex, highly detailed surface shapes can be worked with considerable success and effectiveness. See U.S. Pat. No. 5,125,191, Rhoades.

It is in the context of such abrasive machining to which the present invention particularly relates, although the considerations disclosed and described herein may have broader and more general applicability in specialized circumstances.

PROBLEMS IN THE ART

Orbital working with abrasive flow machining techniques have been employed with effectiveness. Such operations have been limited in some contexts, however, by several factors. First and foremost, the mode of operation in the prior work is based upon fluid or plastic flow of the medium across the surfaces of the work piece. The action is based on "extrusion" of the medium through a restricted gap between the work piece and the mating displacer or mandrel. Such flow does an excellent job of polishing surfaces at high speed, but for more demanding operations involving significant removal of stock from the work piece, the operation is typically slow. There is a need in the art for techniques for attaining adequate working at higher and more productive rates.

Second, the chamber in which the orbital working takes place must be closed or seated to confine the medium within the chamber, assuring adequate strain rates are attained and imparted to the medium to provide the required work, adding to the complexity of the equipment and the time and effort required to change work pieces. These requirements also contribute substantially to the cost of the process and equipment and may, in some cases, be a limiting factor determining the rate of production.

OBJECTS OF THE INVENTION

It is an object of the present invention to provide an improved abrasive machining process and apparatus in which a separation is maintained during the processing between the visco-elastic medium and portions of the work piece. It is another object of the present invention to provide an improved abrasive machining process and apparatus employing a visco-elastic abrasive medium which conforms to the shape and conformation of each work piece.

It is another object of the present invention to provide an improved abrasive machining process and apparatus employing a visco-elastic abrasive medium which performs abrasive work on each work piece predominantly by elastic deformation.

It is still another object of the present invention to provide an improved abrasive machining process and apparatus employing a visco-elastic abrasive medium with no requirement for a sealed working chamber.

Yet another object of the present invention is to simplify the requirements for mandrels and displacer elements employed in the system for abrasive machining, and in some cases to eliminate such requirements entirely.

It is yet another object of the present invention to provide an improved abrasive machining process and apparatus employing a visco-elastic abrasive medium for light grinding, deburring, radiussing, leveling and polishing of complex surfaces, and particularly three-dimensioned surfaces where surface detail requires working and repetitive working of multiple work pieces of complex form and shape.

These and still other objects, which are made apparent in the following disclosure and description of the invention, are attained in the present invention.

SUMMARY OF THE INVENTION

The present invention provides light grinding, deburring, radiussing, leveling and polishing of complex surfaces, and particularly three-dimensioned surfaces where surface detail requires working, and in repetitive working of multiple work pieces of complex form and shape. Generally, the apparatus of the present invention comprises a chamber which can be either closed or open for mounting a work piece. Preferably the new medium is fed to a gap, the chamber preferably includes a plurality of inlets for feeding a visco-elastic abrasive medium therein. A drive is provided for imparting relative motion between the work piece and the visco-elastic medium by contacting the visco-elastic medium so as to create a separation between the medium, and portions of the work piece. The separation is filled with a fluid of less viscosity than the medium, such as air. The separation is preferably maintained in the areas adjacent the inlets. In the preferred embodiment a cyclic motion is imparted by the drive which causes the medium to deform from 50 to 99% and preferably from about 80 to 95%. Deformation recovery rate is generally a function of the speed of cyclic rotation, preferably an orbital rotation.

The present invention is based on the practice of abrasive machining with no sealed working chamber by the employment of a visco-elastic abrasive medium, behaving predominantly as an elastic solid at the applied strain of the working motion, and applying orbital or other relative working motion to produce strain rates which bring the medium into a predominantly elastic deformation and often near, but not to exceed, the compressive stress limit at the strain rate employed. (The compressive stress limit generally corresponds to the "upset value" for ductile metals, as determined by ASTM E9-89a, and is closely related to the buckling limit, barreling limit or the fracture limit for the material.)

The preferred visco-elastic abrasive medium is a rheopectic poly(borosiloxane), filled with viscosity increasing stiffening agents and high loadings of the abrasive of choice, and relatively minor amounts of plasticizers. The preferred poly(boro-siloxane) will have a static viscosity of from about $\eta=5\times10^3$ Centipoise to about $\eta=5\times10^5$ Centipoise. The static viscosity of the formulated medium should be in the range of from about $\eta=2\times10^4$ Centipoise to about $\eta=8\times10^6$ Centipoise.

At the high static viscosities and even higher apparent viscosities under applied strain employed in the present invention, the system may be operated at levels which approach the compressive stress limit, which provide both a fast cutting grinding action and a polishing action on the ground surfaces. The action is attributable to a combination of elastic deformation of the medium and a translation of the work piece surface over the semi-rigid surface of the medium. Elastic deformation is assured by the high levels of applied strain, either compressive or in shear, by the motion imparted. There will be sufficient fluid or plastic flow to provide for conformation of the medium to the surface of the work piece, to provide folding of abrasion debris from the surface into the medium and away from the medium /work piece interface, and to provide the movement of the 30 abrasive within the medium to assure that worn abrasive is removed and fresh abrasive is presented to the working interface. It should be noted that the flow rate is relatively slow and that the elastic relaxation ratio should be fast enough in the medium used to impart a relaxation of about 1 to 10% for each cycle. Thus, for the apparatus of the preferred embodiment is from about 10 seconds to about 1 ten thousands of a second.

The relative motion drive will desirably be operated at relatively small amplitude recurring relative motion, typically an orbital motion, at a relatively high frequency, producing correspondingly high strain rates on the medium. Typical parameters will be an amplitude of motion (e.g., orbital radius) of about 0.010 to about 0.500 inch, preferably about 0.040 to 0.250 inch, and a frequency of from about 5 to 100 Hz, preferably about 12 to 25 Hz.

The system is operated in an open or closed chamber, preferably closed, under applied strain rates such that at least about 50%, particularly about 50 to 99%, and preferably about 80 to 95%, of the deflection of the medium under the conditions of operation occurs by elastic deformation and is elastically recovered, and less than 50%, particularly about 1 to 50%, preferably about 5 to 20%, of the deflection of the medium occurs by fluid or plastic flow.

A preferred medium such as poly(boro-siloxane) carrier matrix is adapted particularly to the requirements of the system is also provided. It employs much higher viscosities and loadings of abrasive than are employed in abrasive flow machining in the prior art, in a poly(boro-siloxane) carrier matrix.

Compared to the fluid or plastic extrusion flow which is the basis of U.S. Pat. No. 5,125,191, the working rates of the elastic deformation of the present invention are both quite rapid and quite fine, permitting the removal of substantial stock and the attainment of a highly polished surface, in many cases in a single operation with a single medium. Where considerable reduction in roughness is required, it is simple to employ a "roughing" medium followed by a second operation with a "finishing" medium of finer abrasive grit. Rarely will there be occasion to employ more than two media, even to attain the finest surfaces and surface detail and resolution. There is no requirement for sealing the "chamber" in which the operation is performed, and a displacer is optional for a great many forms of work piece, and required only for more complex shapes. In addition, because of the elastic behavior of the medium, the conformate requirements of the displacer, if needed at all, are far less demanding than in our prior work.

Other advantages of the present invention will become apparent from a perusal of the following detailed description of presently preferred embodiments taken in connection with the accompanying drawings.

DETAILED DESCRIPTION

The present invention performs work on surfaces of work pieces to effect light grinding, deburring, radiussing, leveling and polishing of complex surfaces, and particularly three-dimensioned surfaces where surface detail requires such working and in repetitive working of multiple work pieces of complex form and shape.

Figure 1:
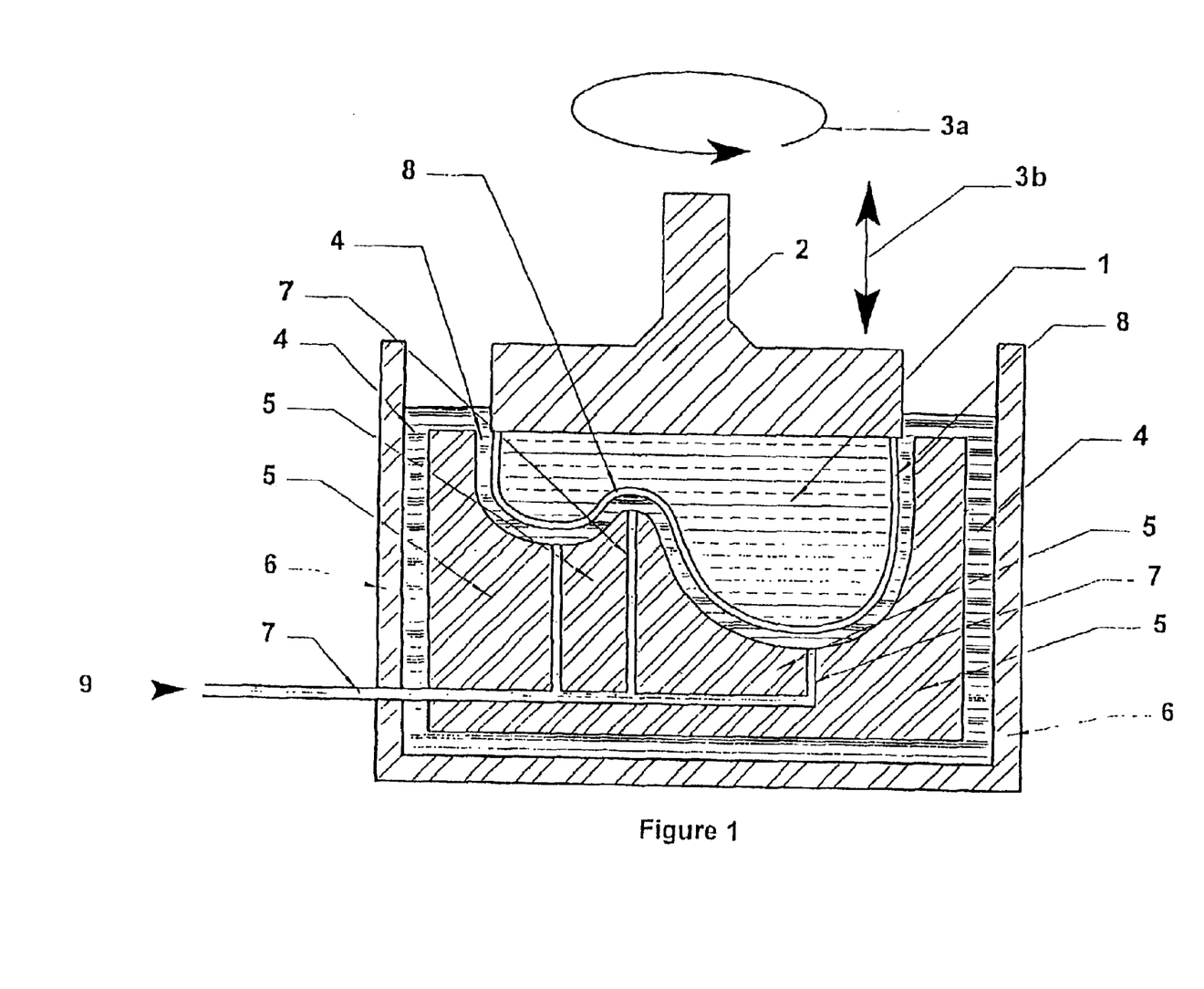
FIG. 1 is a stylized, schematic cross section through the apparatus and an associated work piece which illustrates the elements and arrangements of the present invention.

Referring to FIG. 1, the apparatus of the present invention is represented schematically in an illustrative cross section. In FIG. 1, a work piece (1) is mounted on a fixture (2) which is the working element of a relative motion drive mechanism, the details of which are not shown. Fixture (2) is driven, as illustrated in an orbital motion (3a) on which is superimposed a linear reciprocal motion (3b). The linear motion (3b) serves to advance and retract the fixture and work piece into and out of engagement with the working visco-elastic media (4), and can also be employed to add a reciprocating driving component to the relative motion between the work piece (1) and the media (4) during the working of the work piece (1). The orbital motion (3a) provides the primary relative motion between the work piece (1) and the media (4).

Figure 2:
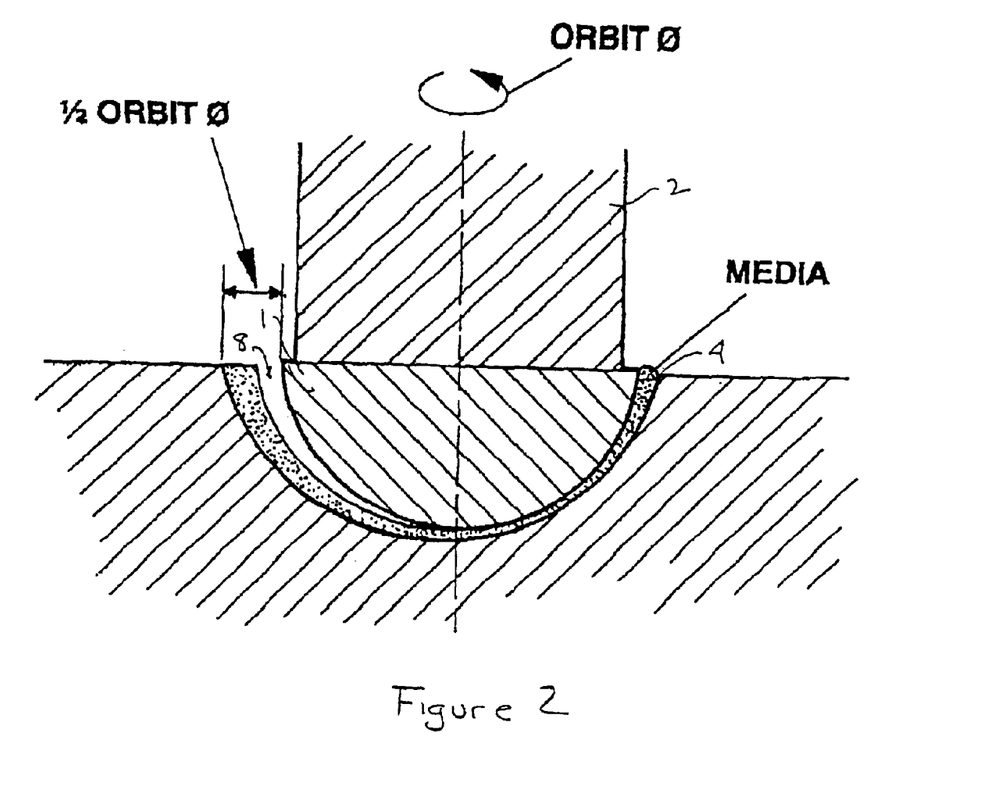
FIG. 2 is an illustrates of the orbital relative rotation between the drive and medium providing the separation between the selected area of the work piece.
Figure 3:
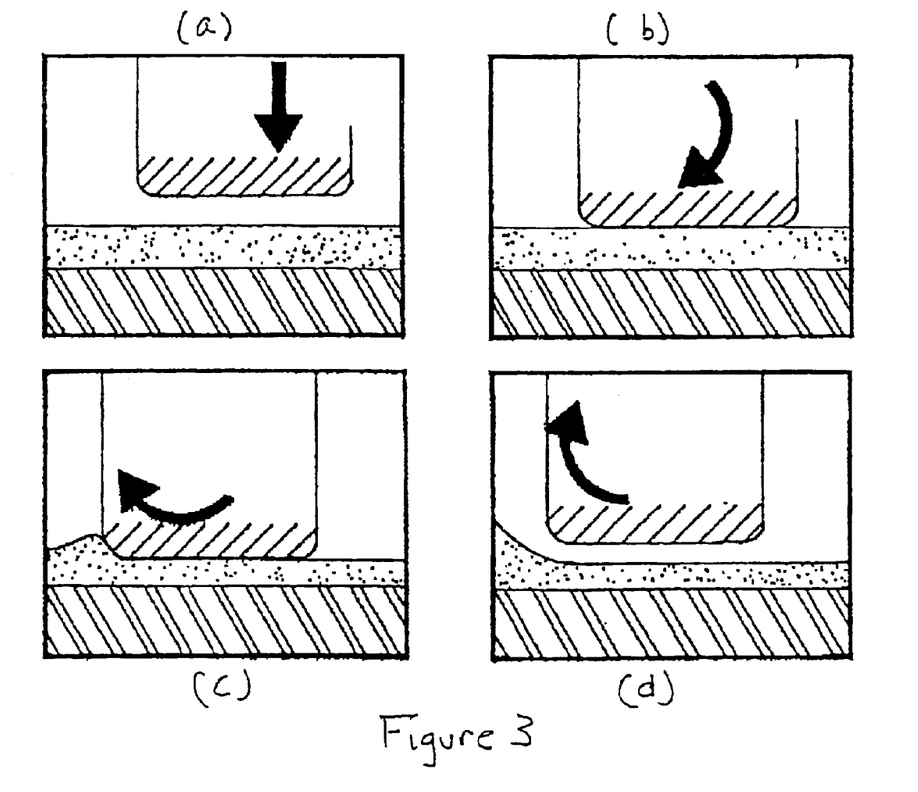
FIGS. 3a–d depict an orbital cycle of the apparatus shown in FIG. 1.

A displacer (5) is preferably shaped as a complement to the shape of the work piece (1) with a stand-off on the order of three to six millimeters, to define a gap (8) between the displacer (5) and portions of the work piece (1) where the working increment of the media (4) is deposited. Separation (10) is shown in FIG. 2 wherein it is defined by a portion of work piece (1) and medium (4) as described in more detail below. The work piece (1), the media (4) and the displacer (5) are all contained within container vessel (6). The displacer (5) and the gap (8) between displacer (5) and the work piece (1) operate to assure that the response of the media to the relative motion drive mechanism and hence the work rate of the abrasive on the surface of the work piece (1) is substantially uniform over the entire surface of the work piece (1) so that at least the selected surface of the work piece to be abraded contacts said abrasive medium under a pressure sufficient to conform said abrasive medium to the surface of the work piece to be abraded, forming a working interface between the work piece and the media Conduits or inlets (7) are provided which pass from a media source (9), into chamber (6), through displacer (5), and into the stand-off gap (8) between the displacer (5) and portions of the work piece (1).

In the embodiment illustrated in FIG. 1, the orbital drive component (3a) and the vertical drive component (3b) serve to engage the work piece (1) with media (4) in a working motion, and create a separation (10) between the media (4) and work piece (1). This imparts a relative repetitive motion between the displacer (5) with its associated work piece (1) and the medium (4) within the chamber (6) at a strain rate sufficient that at least 50% of the deflection of the medium under the conditions of operation occurs by elastic deformation and is elastically recovered, and less than 50% of the deflection of the medium occurs by fluid or plastic flow so that, when said repetitive motion drive actuator is operative and the selected surface of the work piece is in conforming contact with said abrasive medium, the selected surface of the work piece becomes abraded by said abrasive medium as a result of relative movement between said abrasive medium and the selected surface of the work piece. The repetitive motion drive actuator imparts relative movement between said abrasive medium and the contacting surface of the work piece. The motion may be orbital movement, oscillatory movement, reciprocal movement, linear movement, gyratory movement and a combination of two or more of these. Orbital motion is preferred, whether employed alone or as at least one of the components of a composite motion.

In some cases, no displacer (5) or mandrel is required at all. In others, the requirements of the displacer or mandrel may be needed, but the requirements are greatly simplified in comparison to the highly conforming displacer or mandrel required in our prior patent, U.S. Pat. No. 5,125,191, Rhoades. In the present invention, the mandrel, if employed, should be generally configured to a shape complementary to that of the work piece, with an offset forming a gap (8) between the displacer and work piece of from about 3 to about 6 millimeters. As those of ordinary skill in the art will readily recognize, a displacer providing a gap (8) which is permitted to vary from about 3 to about 6 millimeters is readily and inexpensively produced by undemanding and common techniques.

The displacer, when employed, is preferably formed of a resilient, deformable material. Preferably one reasonably resistant to the abrasive action of the media Typically it is desirable to use cast polyurethane materials for such displacers.

At the high viscosity levels of the media and the high rate of operation of the relative motion drive mechanism preferred in the present invention, the compression and flow of the media during operation are such that the separation (10) formed by the relative motion is maintained through each cycle, and the contact between the work piece (1) and the media (4) is substantially tangential to the path of the driven work piece (1) as the work piece (1) moves within the gap (8). In FIG. 1, gap (8) is illustrated as uniform across the cross section, which would be illustrative of the condition when the contact of the orbital motion (3a) is at 90° to the plane of FIG. 1 and the linear oscillation (3b) is in the "up" position, see also FIG. 3.

A flow of the media into the gap (8), via the conduit (7) from media supply (9), is preferably passed substantially continuously into the gap (8), where it displaces an increment of the media within the gap (8) by fluid or plastic flow, substantially continuously refreshing the working media at the interface with the work piece (1). Media displaced from the stand-off gap (8) carries away heat and machining and polishing debris removed from the surface of the work piece (1). Displacement of the media also assures that fresh, unworn abrasive particles are brought to the interface. A repetitive motion drive actuator means is connected to at least one of the fixture and the receptacle to impart a relative repetitive motion between the fixture with its associated work piece and the media within the receptacle at a strain rate sufficient that at least 50% of the deflection of the medium under the conditions of operation occurs by elastic deformation and is elastically recovered, and less than 50% of the deflection of the medium occurs by fluid or plastic flow. Therefore, when said repetitive motion drive actuator is operative and the selected surface of the work piece is in conforming contact with said abrasive medium, the selected surface of the work piece becomes abraded by said abrasive medium as a result of relative movement between said abrasive medium and the selected surface of the work piece. The fixture releasably retains the work piece in a manner to prevent relative movement between said fixture and the work piece.

Preferably, the inlets in fluid communication between said chamber and an external reservoir of media is such that the abrasive medium can be selectively injected into and extracted from said chamber while the fixture is in place in the chamber. Even more preferably a second inlet in fluid communication may be included between the chamber and the external reservoir of media so that the abrasive medium can be continuously injected into and extracted from said chamber while the fixture is being worked within the chamber, in a continuous recycle stream.

The repetitive motion drive actuator imparts relative movement between said abrasive medium and the contacting surface of the work piece. The motion may be orbital movement, oscillatory movement, reciprocal movement, linear movement, gyratory movement and a combination of two or more of these. Orbital motion is preferred, whether employed alone or as at least one of the components of a composite motion.

Because the contact between the surface of the work piece (1) and the media (4) is substantially tangential to the work piece surface, elastic deformation of the media is in the same direction. Thus, abrasive work on the surfaces of the displacer is relatively limited. In addition, the tangential orientation of the elastic deformation results in the abrasive "scrubbing" across the surface which limits the development of deep scratches and gouges into the surface of work piece (1). In the preferred embodiment of the invention, the tangential component of the elastic deformation is approximately ten times that of the radial component.

The present invention is based on the practice of abrasive machining with no sealed working chamber by the employment of a visco-elastic abrasive medium, behaving predominantly as an elastic solid at the applied strain of the working motion, and applying orbital or other relative working motion to produce strain rates which bring the medium into a predominantly elastic deformation and often near, but not to exceed, the compressive stress limit at the strain rate employed. (The compressive stress limit generally corresponds to the "upset value" for ductile metals, as determined by ASTM E9-89a and is closely related to the buckling limit, barreling limit or the fracture limit for the material.)

For purposes of understanding the following description of the operation of the apparatus and the methods of the present invention, the term light grinding refers to machining operations on a work piece which correct errors of form. Deburring is employed to refer to such operations performed to remove flaws. Radiussing is the term employed to refer to operations which effect a softening or dulling of sharp edges of the work piece, by "rounding over" of the edge. Leveling refers to a reduction in waviness of a work piece surface by the machining operations and, in the context of the specific operations of the present invention, also serves to reduce lay in the waviness domain. The term polishing refers to a reduction in roughness of work piece surfaces; when the discussion relates to the present invention, the term polishing also includes a reduction of lay in the roughness domain.

The terms errors of form, flaws, waviness, roughness and lay are employed as defined in ASME B46.1 (1995), SURFACE TEXTURE (SURFACE ROUGHNESS, WAVINESS, AND LAY), 1996, American Society of Mechanical Engineers, New York.

Errors of form are deviations of the real surface of a work piece from the nominal surface of the work piece as designed and represent dimensional errors in geometric form greater than the features included in surface texture. Such errors are those which arise from topographical errors or flaws in production of the work piece or in production of tooling and equipment which produce the work piece.

Flaws, waviness, roughness and lay, taken collectively, are the properties which constitute surface texture. Flaws are unintentional, unexpected and unwanted interruptions of topography of the work piece surface. Flaws are typically isolated features, such as burrs, gouges and scratches, sprue flashings in casting, rolled edges, and similar features.

Roughness refers to the topographical irregularities in the surface texture of high frequency (or short wavelength), at the finest resolution to which the evaluation of the surface of the work piece is evaluated. Roughness is typically an incident of the limits of tooling and methods of production of the work piece and may include the characteristics of the material of which the work piece formed by such methods.

Waviness refers to the topographical irregularities in the surface texture of longer wave lengths, or lower frequency than roughness of the surface of a work piece. Waviness is commonly an attribute associated with the limits of control and stability of a particular methodology by which the work piece is made. Waviness may arise, for example, from machine or work piece vibration or deflection during fabrication, tool chatter and the like.

Lay is the predominant direction of a pattern of a surface texture or a component of surface texture roughness and waviness may have different patterns and differing lay on a particular work piece surface.

Surface texture parameters are relative measures of conformity to some particular specification relating to the required properties and characteristics of the design of the work piece. As such there is no necessary boundary between roughness and waviness, and such parameters form a continuum of measurement related to the specification for the work piece. By the same token, the difference between surface texture and errors of form are relevant only in the context of the geometric specification of the topography of the work piece and the accuracy, tolerances and precision required of the design of the work piece. The relativity of these parameters is not generally relevant to the present invention, as the invention relates to working the work piece to improve the characteristics of the surface in these parameters.

In the present invention, a method of abrasive working of a work piece with a visco-elastic medium filled with a solid particulate abrasive is provided, at its broadest comprising the steps of:

mounting a work piece on a repetitive motion drive mechanism adapted to impart relative motion between the work piece and the visco-elastic medium, where the relative motion may be reciprocating linear motion, orbital motion, gyratory motion, rotary motion, or the resultant of a combination or two or more such motions. The relative motion may be varied in amplitude and/or in frequency over time;

the work piece is placed in conformal contact with a flowable visco-elastic abrasive medium. It is preferred that the visco elastic abrasive medium has a static viscosity of from about $\eta=2\times10^4$ Centipoise to about $\eta=8\times10^6$ Centipoise. It is also preferred that the visco-elastic abrasive medium is a rheopectic polymer filled with a particulate solid abrasive, and particularly preferred that the rheopectic polymer is a poly(borosiloxane).

Relative motion is produced between said work piece and said visco-elastic abrasive medium at strain rates sufficient that at least 50% of the deflection of the medium under the conditions of operation occurs by elastic deformation and is elastically recovered, and less than 50% of the deflection of the medium occurs by fluid or plastic flow. Preferably, the relative motion between said work piece and said visco-elastic abrasive medium provides strain rates sufficient that from 50% to about 99% of the deflection of the medium under the conditions of operation occur by elastic deformation and is elastically recovered, and 1 to 50% of the deflection of the medium occurs by fluid or plastic flow. Most preferably, the relative motion between said work piece and said visco-elastic abrasive medium is at strain rates sufficient that from 80% to about 95% of the deflection of the medium under the conditions of operation occurs by elastic deformation and is elastically recovered, and 5 to 20% of the deflection of the medium occurs by fluid or plastic flow.

Expressed in other terms, the present invention provides a method of abrasive working of a contoured work piece with a visco-elastic medium filled with a solid particulate abrasive, comprising the following steps which are to be considered in view of FIGS. 2 and 3a–d.

The operation starts by mounting a contoured work piece on a cyclic repetitive motion drive mechanism.

The work piece is then engaged in conformal contact with the visco-elastic abrasive medium, where the medium has a static viscosity of at least about $\eta=2\times10^8$ Centipoise and an elastic relaxation rate of from about 10 to about 10,000 sect$^{-1}$ at the temperature and strain rate of operation. Like all polymers, the visco-elastic abrasive medium has a relaxation rate which is a nonlinear function of the applied rate of deformation and temperature.

The repetitive cyclic relative motion between the work piece and the media is conducted at an amplitude and frequency sufficient that the visco-elastic medium deforms in response to the relative motion in part by fluid or plastic flow to define an intermittent separation between the visco-elastic medium and areas of the work piece not parallel to the direction of the relative motion during a portion of each cycle of the relative motion, the separation being filled with a fluid less viscous than the visco-elastic medium and being displaced from the separation when the separation closes by relative approach of the work piece and the visco-elastic medium.

The visco-elastic medium deforms in response to the relative motion in part by elastic deformation and elastic rebound during each cycle of the relative motion, such that the visco-elastic medium and the areas of the work piece not parallel to the direction of the relative motion come into abrasive working contact during each cycle.

The translational velocity of the relative motion between the visco-elastic medium and areas of the work piece at least substantially parallel to the direction of the relative motion is greater than the relaxation rate of the visco-elastic medium, such that the visco-elastic medium and the areas of the work piece at least substantially parallel to the direction of the relative motion are in abrasive working contact throughout each cycle.

The strain rate imparted to the visco-elastic medium is less than that required to reach the compressive stress limit of the medium.

The relative motion is continued for a time sufficient to perform the required level of abrasive work on the work piece by the relative motion between the visco-elastic medium and the work piece.

The present invention also encompasses an apparatus for abrasive working of a work piece with a visco-elastic medium filled with a solid particulate abrasive.

The apparatus includes means for mounting a work piece on a repetitive motion drive mechanism. Any of the vast array of mechanisms known in the art may be employed, provided that it can reliably and uniformly produce the required power and strain rates dictated by the method of the present invention. The relative motion may be reciprocating linear motion, orbital motion, gyratory motion, rotary motion, or the resultant of a combination thereof. The relative motion may be variable in amplitude and/or in frequency over time.

A visco-elastic abrasive medium is employed in the apparatus. The visco-elastic abrasive medium has a static viscosity of from about $\eta=2\times10^4$ Centipoise to about $\eta=8\times10^6$ Centipoise. The preferred visco-elastic abrasive medium is a rheopectic polymer filled with a particulate solid abrasive, particularly a poly(boro-siloxane).

The apparatus must include means for engaging said work piece in conformal contact with said visco-elastic abrasive medium. An open container for the medium into which the work piece is advanced into contact with the medium will typically be employed. The medium employed in the present invention does not require pressurization or confinement.

The repetitive motion drive mechanism is required to impart relative motion between said work piece and said visco-elastic abrasive medium at strain rates sufficient that at least 50% of the deflection of the medium under the conditions of operation occurs by elastic deformation and is elastically recovered, and less than 50% of the deflection of the medium occurs by fluid or plastic flow. It is preferred to employ strain rates sufficient that from 50% to about 90% of the deflection of the medium under the conditions of operation occurs by elastic deformation and is elastically recovered, and 1 to about 50% of the deflection of the medium occurs by fluid or plastic flow. In most cases strain rates will be employed so that from 80% to about 95%, of the deflection of the medium under the conditions of operation occur by elastic deformation and is elastically recovered, and 5 to about 20% of the deflection of the medium occurs by fluid or plastic flow.

In the present invention, the employment of abrasive particle laden visco-elastic media is employed at strain rates exceeding those commonly employed in the art of abrasive flow machining, with the result that a number of new and highly beneficial properties are attained. By operating at very high strain rates, extremely fine grinding, polishing and deburring effects are produced on work pieces, matching or exceeding those observed in typical abrasive flow machining processes.

These effects are attained with a rapidity which is not common to more usual forms of abrasive flow machining, which typically require substantial processing time to attain a designated result. In many circumstances, the work required is attained in half or less the time required for typical abrasive flow machining operations.

The high quality working of work pieces in the present invention is often able to produce results with a single operation which heretofore has required, multiple operations in abrasive-flow machining, employing, for example, multiple media with differing abrasive grain sizes. In other cases, while multiple operations may be required, the operation is still far more economical of time, labor, materials and capital equipment.

The nature of working in the present invention permits far simpler tooling and equipment that is typically employed in abrasive flow machining as generally practiced in the art. While operation at high strain rates is demanding on the equipment employed, the greater simplicity of design of such systems permits a savings in cost which is often quite substantial.

The present invention is capable of use on work pieces of any material which can be worked by abrasives to effect light grinding, deburring, radiussing, leveling and polishing of work piece surfaces. Most commonly the invention will be employed with metal work pieces, including, for example, steels, including mild steel, tool steels, stainless steels, and the like, aluminum, aluminum-magnesium alloys, beryllium copper alloys, titanium, and many others. Less commonly, the invention may also be employed on ceramics, cerements, and other machinable composites, glass, semi-conductor materials, and the like. The operations of the present invention can also be employed to polish (and shape) hard plastic materials, such as polymers, including poly(methyl methacrylate) and poly(carbonates) and reinforced polymer composites, such as fiberglass laminates and the like. An interesting application arises in the polishing (and shaping) of poly(carbonate) lenses or glass lenses for optical systems, and the like.

The work pieces to be worked in the present invention may have surfaces which are cast, stamped, machined or milled, bobbed, forged or formed by non-traditional machining techniques, such as electrical discharge machining, chemical or electrochemical milling. Other work pieces may be formed by techniques such as powder metallurgy, including the techniques of three dimensional printing, and the like.

Abrasive working in accordance with the present invention has demonstrated itself to be effective for a number of applications as the finishing technique of choice. Such techniques are particularly adapted, for example, to light grinding, deburring, radiussing, leveling and polishing of complex surfaces and particularly three-dimensioned surfaces where surface detail requires working, and in repetitive working of multiple work pieces of complex form and shape.

In most cases, the work pieces to be worked with the process of the present invention will be at or near net shape, requiring little or no dimensioning. It is generally not preferred to rely on the operations of the present invention to remove substantial stock from the work piece in order to attain the required dimensional tolerances, although such operations can be performed if the additional processing time is acceptable. The extent of stock removal is directly proportional to the time of processing and significant amounts of stock can be machined from the work piece if required, but the control of dimensional tolerances when extensive machining is performed may require the use of tooling, masking and mandrels to assure that the work is performed in the appropriate areas and is not excessive in other segments of the work piece surface. Such techniques are known in the abrasive flow machining art and can be adapted to the present invention where they will function in a known manner, but the time, labor and equipment cost of the operations are considerably increased, so that such requirements are preferably avoided. It is accordingly preferred to begin with a work piece which is near net shape and avoid the use of mandrels and tooling as much as possible.

It is a characteristic of the typical operation of the present invention that surfaces are worked by the media more extensively on protruding aspects than on non-protruding features. This leads to the usually desirable effect that protruding surface irregularities are ordinarily reduced and brought down to the level of the surrounding surface area If the work is continued long enough, the entire surface is worked down to the level of the lowest aspect of the surface. The leveling effect thus attained is highly desirable in many contexts, and undesirable in others. It is accordingly important to manage the extent of the grinding and polishing effects so that the result is consistent with the specific objectives for the particular work piece.

When curved parts are processed in the present invention, the curves are normally faired, into smooth progressive shapes, without abrupt changes or "hard" spots in the curves. These aspects of the invention are of particular interest where the visual appearance of the work piece is of substantial importance, and where sharp edges, corners and hard curves are detrimental to the characteristics of the work piece, such as avoiding loci for the development of stress cracking and the like.

Flatness of planar aspects of the work piece will be enhanced as well, with the reduction or elimination of waviness, bumps, hollows, and other imperfections.

The leveling flattening and fairing of surfaces is observed both in macro (grinding) reduction of errors of form and in micro (polishing) reduction of surface roughness and waviness aspects of the process. Surface protrusions, such as waviness, bumps and hollows in the work piece, in a few hundred micrometers (or tens of mils) are reduced in relation to the surrounding surface areas while, concurrently, surface roughness is reduced as well, as measured in a few, or even less than one, micrometers. Thus, both grinding and polishing are attained in the same operation.

Grinding operates to effect the removal of surface features, tool and die features and marks, errors of form, burrs, scratches and like imperfections. Grinding in accordance with the present invention will also remove recast surface layers when present. The removal of recast surface layers can eliminate the requirement for post-processing heat treatments in some, and indeed, in many cases.

In typical cases, the micro-finish of the work piece will be improved by as much as a 15:1 reduction in roughness in a single operation with a suitable abrasive grit for the initial condition. (Further polishing generally will not substantially improve the finish once such a level of improvement is attained.) If a less fine surface is acceptable, less processing time is required, enhancing production rates in use. If further polishing, i.e., a further reduction in surface roughness, is required, a further operation of the present invention employing a finer abrasive can provide as much as an additional 5:1 or even 15:1 reduction in roughness. (It should be noted that it would be possible to start the operation with the finer abrasive medium in the first instance, but the processing time requirements would generally prove excessive and the productivity of the polishing operations would be generally unsatisfactory. It is far more effective and economical to attain reductions in surface finish of magnitudes greater than 20:1 in two or more separate operations with abrasive particle sizes suitable for the conditions.) The final surface roughness can be as little as 0.2 um (or about 0.1 micro-inches) R. as measured in accordance with ASME B46.1 (1995), SURFACE TEXTURE (SURFACE ROUGHNESS, WAVINESS, AND LAY), 1996, American Society of Mechanical Engineers, New York. While such finely polished surfaces are not typically required of many applications of the present invention, it is sufficient to note that coarser surface polishing consistent with work piece requirements is more readily and rapidly attained.

Burrs and upset edges are commonly formed during machining operations. It is generally appropriate to employ the present invention for the removal of burrs and upset or rolled edges. Buff removal occurs as an intrinsic part of the operation of the present invention. Because of the prominence of such protruding features, they are typically removed at the earliest stages of the operation, so that if deburring is the major objective of the utilization of the method of the present invention, the result can be attained with very rapid results.

In addition to the removal of burrs and upset or rolled edges, all edges are gradually radiussed during the operation of the present invention. The extent is generally a function of the time of processing initially proceeding at a quite rapid rate, and gradually slowing as the surface is rounded. If no radiussing of edges is wanted, it is appropriate to employ a protective masking of the edge and the surface immediately adjacent the edge, employing the techniques known in tile abrasive now machining art.

An intrinsic effect of the present invention is the development of a substantial level of work hardening of the surfaces of work pieces. The effect is typically comparable to that ordinarily attained by shot peening or other comparable techniques. In most contexts, such work hardening is a desirable feature, but as those of ordinary skill in the art will readily recognize, post processing heat treatments can eliminate such surface effects when appropriate.

For those of ordinary skill in the art, the equipment to be employed will be surprisingly simple and inexpensive when compared to the requirements of more usual forms of abrasive flow machining.

The preferred visco-elastic abrasive medium is a rheopectic poly(borosiloxane), filled with viscosity increasing stiffening agents and high loadings of the abrasive of choice, and relatively minor amounts of plasticizers. The media have a static viscosity of from about $\eta=2\times10^4$ Centipoise to about $\eta=8\times10^6$ Centipoise; the poly(boro-siloxane) polymer typically has a static viscosity of about $\eta=5\times10^3$ Centipoise to about $\eta=5\times10^5$ Centipoise.

Compared to the fluid or plastic extrusion flow which is the basis of U.S. Pat. No. 5,125,191, the working rates of the elastic deformation of the present invention are both quite rapid and quite fine, permitting the removal of substantial stock and the attainment of a highly polished surface, in some cases in a single operation with a single medium. There is no requirement for sealing the chamber in which the operation is performed, and a displacer is optional for a great many forms of work piece, and required only for more complex shapes. In addition, because of the elastic behavior of the medium, the conformal requirements of the displacer, if needed at all, are far less demanding than in the prior art.

The chamber is not sealed, so that the equipment and its use are far less demanding and complex. In addition, when the separating-filling fluid described above is air, the open chamber permits communication between the separation and the atmosphere as the source of the air. When the separating-filling fluid is a material other than air, it is convenient to employ a liquid which fills the separation and, when displaced, rises-above the upper level of the media in the chamber, with the open access to the atmosphere permitting such flow of the fluid without substantial back pressure.

Either the abrasive medium, the work piece or both are subjected to a repetitive motion mechanism to produce a relative motion between the work piece and the medium. The relative motion may be reciprocating linear motion, orbital motion, gyratory motion, rotary motion, or the resultant of a combination of two or more such motions. The relative motion may be varied in amplitude and/or in frequency over time.

The relative motion drive mechanism may drive either the media containment or the work piece; in some contexts, it may be employed to drive both. The key requirements of the drive mechanism are sufficient power to provide substantially continuous duty at the conditions of operation, suitable amplitude and frequency of the relative motion, and optionally the capacity to change the amplitude and/or frequency dynamically during the operation.

The relative motion drive will desirably be operated at relatively small amplitude recurring relative motion, typically an orbital motion, at a relatively high frequency, producing correspondingly high strain rates on the medium. Typical parameters will be an amplitude of motion (e.g., orbital radius) of about 0.25 to about 12.5 mm (about 0.010 to about 0.500 inch), preferably about 1 to about 6.5 mm (about 0.040 to 0.250 inch), and a frequency of from about 5 to 100 Hz, preferably about 12 to 25 Hz. Smaller amplitudes and higher frequencies are desirable from a functional standpoint, but tend to escalate the cost of the drive mechanism, and may exceed the compressive stress limit of the media. It is particularly preferable to combine an orbital motion (typically with little and preferably no rotation of the driven element) in a plane with a continuous or intermittent linear oscillation in an axis normal (or nearly so) to the orbital plane. The linear oscillation in such cases typically should be at a different frequency than the orbital component In other cases, it is preferable to impose a continuous or periodic advance of the work piece into the medium in an axis normal (or nearly so) to the orbital plane during the working cycle.

When the configuration of the work piece requires it, the various non-circular orbits and complex orbital and/or gyratory motions can be employed as described in the literature and generally known to those of ordinary skill in the art of such additional components, of the motion serve at least to assure substantially uniform distribution of the media over the surface of the work piece is attained and maintained throughout the operating cycle. In some cases, they contribute to the abrasive work in other ways, as well, providing for example, a more complex path of the medium across the surface of the work piece, further contributing to avoidance of the formation of surface lay, and assisting in removing the lay of the surface as received.

At the high static viscosities and even higher apparent viscosities under applied strain employed in the present invention, the system may be operated at levels which approach the compressive stress limit, which provide both a fast cutting grinding action and a polishing action on the ground surfaces. The action is attributable to a combination of elastic deformation of the medium and a translation of the work piece surface over the semi-rigid surface of the medium; elastic deformation is assured by the high levels of applied strain, either compressive or in shear, by the motion imparted. There will be sufficient fluid or plastic flow to provide for conformation of the medium to the surface of the work piece, to provide folding of abrasion debris from the surface into the medium and away from the medium/work piece interface, and to provide the movement of the abrasive within the medium to assure that worn abrasive is removed and fresh abrasive is presented to the working interface.

Operation of the system causes heating of the media during operation. We prefer to take appropriate steps to limit the temperature rise in the media to avoid temperature higher than about 140° F. preferably avoiding media temperatures above about 130° F. In most cases, it is preferable to employ a recirculating flow of the media into and out of the containment chamber, so that increments of media in the gap are displaced and replaced by fresh, cooler media The net flow additionally adds assurance of a substantially uniform distribution of the media and continuous working contact with all the surfaces of the work piece to be worked.

The system is operated in the containment chamber under applied strain rates such that at least about 50%, particularly about 50 to 99%, and preferably about 80 to 95%, of the deflection of the medium under the conditions of operation occurs by elastic deformation and is elastically recovered, and less than 50%, particularly about 1 to 50%, preferably about 5 to 20%, of the deflection of the medium occurs by fluid or plastic flow.

The work piece must be engaged by a fixture or tool to place and hold it in conforming contact with the abrasive medium. If the work piece is the driven element of the relative motion drive mechanism, as will often be the most convenient and preferred arrangement, the fixture or tool is preferably a part of the drive mechanism.

While not a requirement of the invention, it is generally effective to provide a mechanism by which the work piece is advanced into the media containment chamber and into its conforming contact with the medium within the chamber from an external mounting station where the work piece is mounted on the fixture or tool. Such an arrangement can greatly facilitate use of the invention by making the mounting and engagement of the work piece faster, simpler and demanding on the machine operator, or in suitable cases permit automation of the operation by such means to permit unattended operation (at least for substantial periods and substantial numbers of parts). In concert, or as an alternative, the containment chamber itself may be adapted to advance toward and retract from the interface with the work piece in its operational position.

The chamber is desirably and preferably provided with a port or plural ports to provide for a flow of the media into and out of the chamber. As discussed below, it is preferred that at least two ports be furnished, one inlet and one outlet, communicating via media pumping to provide a recirculating flow of the media into and out of the chamber. Most means to prove preferably, a plurality of inlet and outlet ports are provided.

Suitable arrangements and equipment for pumping such abrasive media are per se known to the art, and do not in and of themselves form a part of the present invention. Any such means suitable for providing such recirculating flow may be employed in the present invention.

In operations on work pieces of complex geometry, it may be effective to provide mandrels or displacers generally conforming to the shape of the work piece, provided with a suitable standoff, to provide gap (8) in which the media are loosely confined. Such expedients are comparable in configuration to the displacers employed in prior U.S. Pat. No. 5,125,191, but in the context of the present invention the displacer operates in a rather different manner.

Because of the predominance of elastic deformation in the operation of the method, a displacer serves primarily to limit elastic deformation and to limit the mass of the medium deformed by the operation and the hysteresis delay of elastic rebound of the mass. In addition, in regions parallel to the path of the repetitive motion and in areas which are characterized by deep concavities in the work piece form, a displacer serves to direct flow of the medium into and out of contact with the work piece surface at the interface to assure consistent and uniform working over the work piece surface. As previously noted, the conformation of the displacer or mandrel is far less demanding than in the prior patent, and it is generally sufficient to conform the shape to provide a standoff gap 8 of from about 3 to about 6 millimeters.

Either the abrasive medium, the work piece or both are operated upon by a repetitive motion mechanism to produce a relative motion between the work piece and the medium. The relative motion may be reciprocating linear motion, orbital motion, gyratory motion, rotary motion, or the resultant of a combination of two or more such motions. The relative motion may be varied in amplitude and/or in frequency over time.

Within limits, the strain rate imparted to the medium by the relative motion should be as high as possible.

In order to attain the major benefits of the present invention, the strain rate should be at least high enough so that at least about 50% of the material deformation of the abrasive medium occurs by elastic deformation and recovery and fluid or plastic flow of the medium becomes a relatively minor proportion of the response of the medium to the relative motion.

In general terms, so long as the compressive stress limit is not reached or exceeded by the operation, the higher the strain rate, the more efficient the operation of the present invention becomes, both in terms of the rate of working (and therefore the processing time required and product throughput attained) and in terms of the energy requirements of the system.

It is important that the relative motion between the work piece and the medium not exceed the compressive stress limit, as the result is uniformly detrimental to the operation. The compressive stress limit will be a function of the particular polymer carrier for the medium, the intrinsic or rest viscosity of the medium as formulated, the change of viscosity with applied strain and increasing temperature during operation of the invention, and the loading of abrasive and solid diluents. Some of the effects of these parameters may be offset by plasticizers and/or lubricants added to the media formulation. For any specific medium formulation, the compressive stress limit should be above the useful strain rate to be employed and desirably should be measured to assure that suitable limits on the operation are not exceeded.

In the case of the preferred poly(boro-siloxane) based media, exceeding the compressive stress limit results in such a dramatic increase in the dynamic apparent viscosity of the medium that fracture and granulation of the polymer results, producing a friable polymer powder which is incapable of entraining the abrasive particles, of elastic deformation, and of fluid or plastic flow until the stress is relaxed and the material coalesces. There is a substantial risk that the polymer powder will be scattered by the operation of the equipment and lost from the apparatus. Such effects also degrade the polymer, by chain scission, reducing the useful life span of the medium. In other media, the effects may be less dramatic, and may be limited to chain scission and polymer degradation, but the consequences are equally detrimental to the practice of the invention.

When operating below the compressive stress limit of the media, and at a strain rate that provides substantial and predominantly elastic deformation of the media, the action of the abrasive particles on the work piece surface is different from that in more typical prior forms of abrasive flow machining.

Most notably, the compressive effects of impact between the work piece and the medium at the interface operates to limit and "buffer" or "cushion" the force of the abrasive particles against the work piece surface. Deep cutting, gouging and scratching of the surface does not occur in such a mechanism and substantially larger abrasive particle sizes can be employed to attain even quite finely polished surfaces.

The limitation of the work performed by the compression impact between the work piece and the medium is offset by the recovery and return of the energy imparted to the medium in the compression by the elastic rebound, where additional work is performed on the work piece surface, typically in a direction different from that of the compressive component of the action.

In preferred cases, the relative motion between the work piece and the medium is, at least in part orbital so that the direction of the motion is continuously and constantly changing. As a result, the direction of the path of the abrasive grains across the surface is also constantly changing, both in compression and in rebound. It is the effect of the continuous change in direction which serves to prevent the formation of lay in the surface as worked and the partial or entire removal of lay from the surface in its original condition.

The combination of these features results in working the surface in a fashion which is quite gradual, and yet quite rapid, and with a minimum of localized surface flaws introduced by excessive action of the abrasive, such as deep scratches or gouges of the surface.

It should be noted that some fluid or plastic flow of the abrasive medium is required in the operations of the present invention. While it is not, as in the case of typical abrasive flow machining, the predominant mechanism for performing work on the work piece, it does play an important role in some aspects of the present invention.

First and foremost, it is fluid or plastic flow of the medium which assures conformity of the medium to the surfaces of the work piece.

In addition, for surface areas which are disposed parallel to the direction of the repetitive motion between the work piece and the medium, fluid or plastic flow assures that there will be a local pressure sufficient to press the medium against the surface to be worked. There may be no component of the motion which is directed into the medium in such areas, and elastic deformation alone may not operate to maintain optimal working contact between the work piece and the medium at the interface. Such flow of the media into the chamber assures such local pressure.

A flow of the media throughout the working chamber also serves to assure that fresh abrasive grains are brought to the surface of the media at the interface with the work piece, worn abrasive particles are carried away from the interface, and working debris abraded from the work piece away from the interface.

Flow of the media is also an important part of temperature control, withdrawing hot media from the system so that it can be cooled and then reintroduced in a recycle flow stream.

The time of the processing contemplated in the present invention will vary, predominantly with the nature of the work piece material, the degree of surface texture alteration desired or specified, and the abrasive selected for the operation. So long as the relative motion drive mechanism is adequate to the requirements of the operation, the processing time is largely independent of the size or surface area of the work piece to be worked.

In typical circumstances, the usual ten-fold reduction in surface texture, particularly surface roughness which is typically the primary focus of the operation, can be attained with appropriate selections of conditions and media, within about two to about five minutes of processing time on softer work pieces, such as aluminum and its alloys. For more difficult, i.e., harder, materials, such as steels and the like, the processing time will be correspondingly longer, sometimes ten or even twenty minutes or more.

When processing specifications do not demand a twenty-fold reduction in surface texture or better, reduced operating times can be employed to enhance productivity of the invention.

The temperature will rise in the media, as the work performed in the operation produces substantial amounts of heat, of course. Provisions need to be made to cool the media during operations. A recycle of the media, as discussed below is preferred, providing a cooling outside the apparatus of the present invention, although other cooling may be provided within the processing chamber if desired. It is preferred that the temperature of the preferred poly(borosiloxane) based media be kept below about 140° F., still more preferably below about 130° F.

As the processing proceeds, the abrasive in contact with the surface of the work piece will become worn. As working proceeds, copious amounts of machining debris accumulates in the media as material is removed from the work piece surface, diluting the abrasive particles and increasing the local viscosity of the media. In order to prevent such effects from disturbing or altering the process cycle, fresh media is fed into the interface between the work piece and the media to flush the old media away and provide a supply of fresh media. The old media will be withdrawn from the apparatus and cooled, and then recycled into the fresh media supply. A substantial number of turnover cycles is effective before the media is spent and requires replacement if such recycling is employed.

It is notable that the action of the media on the work piece surface differs with the orientation of the surface relative to the direction or plane of the relative motion.

Surfaces oriented perpendicular or normal to the direction of the relative motion are worked almost exclusively by the elastic deformation and rebound of the media. Surfaces parallel to the direction of the relative motion are worked by elastic deformation and rebound to a far lesser extent because the motion does not impart any substantial compressive force in the direction of the interface between the media and the work piece surface in such regions. The action in such areas is more akin to orbital abrasive flow machining in such areas. The properties and characteristics of working of surfaces at other angles to the relative motion direction are intermediate between these extremes and show the characteristics of both.

These attributes may be of no consequence to the operation in many cases. In others, it will be appropriate to feed media under pressure into the interface of portions of the surface which do not experience compressive strain to assure a flow of media, to assure localized pressure adequate to maintain conformity of the media to the surface, and to remove old, worn abrasive and replace it with fresh increments of new or less worn abrasive.

It is also possible, and may be desirable in some cases, to "pulse" the work piece away from and back into the interface one or more times, typically in a direction normal to of at least different from the direction(s) of the relative motion, to assure that conforming contact with the media is assured.

Another variation is to alter the nature, direction or plane of the relative motion through the process cycle to alter the orientation of the part and its surfaces relative to the direction or plane of the relative motion. By employing different motions or different work piece orientations to the motion at different times through the process cycle, the work performed on all worked surfaces may be controlled. In the most common cases, the control is effected to assure that the abrasive work is equivalent on all surfaces of the work piece, although there are some cases in which the motion may be employed to attain differential working on different aspects of the work piece.

If a composite motion is employed which is the resultant of two or more distinct forms of relative motion, it is often possible to entirely offset the orientation of the work performed on the work piece.

In some cases, the action of the elastic deformation is sufficiently directional that a reversal of the direction of the relative notion drive is needed to assure reasonably uniform working of the surfaces. Such occasions arise, for example, when an orbital drive is employed on complex shapes which present leading surface and trailing surface aspects. The orbital motion results in contact between the work piece and medium which is substantially tangential, and the leading aspects of the work piece surface receive more work than trailing aspects in such a case. To offset this differential effect, it is typically sufficient to reverse the drive mechanism so the work piece is worked in both directions. Such directional effects do not generally occur with simple shapes.

A variety of visco-elastic materials are known to the art of abrasive flow machining. Substantially all can be adapted to the requirements of the present invention. The major categories of such materials commonly employed in the art are polymer gels, particularly hydrogels, and poly(borosiloxanes).

Ionic bonds are frequently employed in ionic cross-linking of a variety of polymers. Such polymers are often water soluble types well suited to use in the present invention. When such polymers are ionically cross-linked, they typically form water swollen hydrogels, having effective viscosity levels to effect highly durable suspensions of the high density abrasive particles to be added in the procedure of the present invention.

In ionically cross-linked hydrogels, the ionic bonds are weaker than the covalent bonds of the polymer backbone, and it is the ionic bonds which are preferentially disrupted and broken upon exposure to high shear stresses and high strain rates generally. The ionic species produced when the bonds are broken are relatively stable, and in the context of the polymer systems employed herein will react only to reestablish the broken cross-links, and thus reestablish the high viscosity hydrogel structure once the high shear stress is removed.

In an alternate embodiment, gel-forming water soluble polymers are formed into hydrogels, with or without gelation promoters such as water soluble salts of metals of Groups III to VIII of the Periodic Table. Hydrogels are based on the formation of intermolecular bonds between the polymer molecules. Such bonds are weaker than ionic bonds and, in the context of the present invention, facilitate thinning of the medium under the high shear stresses imposed in the formation of the polishing jet and providing the sacrificial bonds which protect the covalent bonds of the polymer and minimize chain scission. These hydrogels also serve to promote high viscosity at rest, whether the intermolecular bonds are formed in makeup of the gel or reformed after use, which is highly desirable in preventing settling out of the abrasive particles.

Non-aqueous polymer formulations are also possible where the polymer is cross-linked or gelled by other types of intermolecular bonds. Such formulations are particularly significant to polishing and machining materials which are vulnerable to water, such as ferrous metals and the like.

A preferred non-aqueous polymer, cross-linked and/or chain extended by intermolecular bonds, is the family of poly(boro-siloxanes). These polymers are cross-linked by electron pair sharing between tertiary B atoms in the polymer chain with 0 atoms in the chain of adjacent polymer molecules. The specific properties of significance to the present invention may be very directly and finely controlled including molecular weight of the poly(boro-siloxane), the level of B atoms included in the polymer chain and the like.

The formulation of polishing media based on the use of poly(borosiloxanes) is particularly preferred in the present invention because of the non-aqueous nature of the media, the dose degree of control of viscosity, and the ability to balance viscosity and elastic deformation characteristics to suit the requirements of the polishing and machining operations to be performed. These materials are also particularly preferred because of the rheopectic character of the system.

Intermolecular bonds and chain extending bonds, particularly including the B:O bonds, are weaker than covalent bonds, and polymers are employed which readily form intermolecular bonds, particularly in non-aqueous processing in the present invention. Under the high shear and high elastic deformation conditions involved under the forces of impact between the medium and the work piece surfaces, the intermolecular bonds will be broken preferentially, absorbing a portion of the energy imposed on the polymer, and preserving the covalent bonds which make up the polymer backbone.

Hydrogen bonding alone is not adequate to afford sufficient absorption of the high shear operations and preferably should be relied upon only in combination with other non-covalent sacrificial gel bonds. Hydrogen intermolecular bonds are very weak bonds.

These intermolecular bonds will readily reform over time once the high shear stress is removed, restoring the cross-linked structure and the gel-like high viscosity required of the system.

In the context of the present invention, the cross-linking bonds, i.e., intermolecular bonds, are those first broken under the high shear and high elastic deformation conditions of the operation, and thus sacrifice themselves to protect the covalent bonds from degradation that would otherwise disrupt the polymer chains in permanent, irreversible fashion characteristic of the polymer degradation of the prior art materials and procedures.

The preferred poly(boro-siloxane) employed in the present invention has a viscosity ($\eta$) in the range of about $\eta=5\times10^3$ Centipoise to about $\eta=5\times10^5$ Centipoise.

The elastic bulk modulus, B, of the preferred poly(boro-siloxane) varies inversely with temperature, T, and directly with the rate of deformation, y.

The particle size of the abrasive should be the smallest size consistent with the required rate of working, in light of the hardness and roughness of the surface to be worked and the surface finish to be attained. In general terms, the smaller the particle or "grit" size of the abrasive, the smoother the surface attained. The abrasive will most often have a particle size of from as low as about 1 micrometer up to about 1400–1,600 micrometers (about 16 mesh) or even 2,000 micrometers. More commonly, the abrasive grain size will be in the range of from about 2 to about 400 micrometers, and most commonly from about 20 to about 300 micrometers.

The hardness of the abrasive should be the highest value consistent with the cost of the materials and the limitations of the work piece, in light of the hardness of the work piece material to be polished. Cutting operations also typically employ the hardest and fastest cutting abrasive available, within cost-effectiveness limits. As a general rule, the harder the abrasive, the faster and more efficient the polishing operation. Limiting the hardness of the abrasive may be cost-effective in some cases, since, typically, the harder the material, the more expensive it is. In addition, the employment of softer abrasives limits the material removal rate, which may be desirable in limited circumstances to facilitate control.

Selection of the abrasive material is not critical in the present invention, and any of the commonly employed materials will be effective. Examples of suitable materials include, for illustration, alumina, silica, garnet, silicon carbide, boron carbide, diamond, and the like. At higher viscosities it may be possible to use tungsten carbide, although its density may pose problems in maintaining effective dispersion in the medium. The reuse of the polishing medium permits economic use of harder, but more expensive abrasives, with resulting enhancements in the efficiency of polishing and machining operations to increase the polishing rate when required. For example, silicon carbide may be substituted in polishing operations where garnet has been used.

In general, the abrasive will desirably be employed at concentrations in the formulation at levels of from about 30 to about 90 weight percent, preferably about 65 to about 85 weight percent. We have found that operation at the preferred range, and lower in some cases, is quite effective.

A de facto upper limit on the particulate concentration (i.e., the abrasive plus the accumulated machining debris from the work piece), occurs at the level at which "bridging" or particle to particle contact becomes substantial. Bridging is undesirable because it leads to excessive gouging and scratching of the work piece surface by the abrasive.

Bridging is greatly increased when the critical particulate solids volume concentration of the media formulation is exceeded. Once the critical particulate solids volume concentration is exceeded, the extent of bridging is directly proportional to the extent of excess solids.

The critical particulate solids volume concentration is defined as the concentration of particulate solids at which the volume of the carrier is just sufficient to fill the voids and interstices among the particulate solids particles. When the solids are higher in proportion, the formulation is starved for carrier (polymer base and plasticizer) and voids occur within the mass of the media In many media, it is often desirable and even necessary to exceed the critical particulate solids volume concentration to achieve certain intended properties. Most commonly, such techniques are employed when coarse grinding and machining operations are conducted, and where the equipment and methodology can accommodate the bridging effects that result, as in lapping operations. Such characteristics are familiar to the art. Such effects should be avoided in the present invention. The critical particulate solids volume should not be exceeded. We typically employ a level of the abrasive particles of about 4:1 by weight, based on the weight of the polymer, which corresponds generally to a volume ratio of about 2:1, based on the volume of the polymer, to assure that sufficient capacity to accumulate substantial amounts of debris in the media from the work piece is provided.

There is no literal lower limit to the abrasive concentration, although it should be kept in mind that the abrasive content is a major determinant of the viscosity of the medium, and when the viscosity is too low, the required elastic deformation may not occur. When low concentrations of abrasive are employed, other techniques for attaining the required viscosity may be employed. In addition, the rate at which work is performed on the work piece is related to the concentration of the abrasive, and it is appropriate to assure that the concentration is sufficient to attain the process cycle times and productivity for best efficiency in the working of the work pieces required in the operation.

As noted above, the abrasive particles can range from 1 to 2000 micrometers in their major dimension (diameter), preferably from about 20 to 300 micrometers. For surfaces where a fine surface finish is desired particle sizes of from about 20 to about 100 micrometers are particularly advantageous. It will generally be appropriate to employ the largest particle size consistent with the required polishing and grinding rate and the specified finish characteristics to be attained in the operation.

For a given abrasive particle size, we have also observed that the surface finish of the work piece is rapidly brought to the same or better levels attainable with hand polishing or lapping techniques, but with far less labor and time. When coupled with the ability to use smaller particle sizes, it is ordinarily possible to produce surface finishes which require no hand surface finishing procedures, reducing the number of operations and the amount of labor and equipment required in production. When used to break or radius sharp edges and remove burrs, the technique is rapidly effective and readily controlled.

Inelastic fillers, thickeners, plasticizers, lubricants, extenders, diluents and the like may be used in the preferred media of the present invention, much as they have been employed in abrasive flow media of the prior art, but their use should be limited. We prefer to limit the amount of such additives to no more than about 25 weight percent of the media formulation.

In the present invention, the viscosity, of the abrasive media should be higher than typical of abrasive flow machining in the prior art. The extent of elastic deformation at a given shear rate increases with viscosity, while the extent of fluid or plastic flow decreases correspondingly. In the context of drive mechanisms suitable for the present invention, we prefer to employ media with viscosities of from about $\eta=2\times10^4$ Centipoise to about $\eta=8\times10^6$ Centipoise, which corresponds to the development of at least about 50% elastic deformation at operating condition of the present system at strain rates greater than about 2.5 sec$^{-1}$ Employing the preferred poly(boro-siloxane) polymers of the present invention, which themselves have a viscosity of from $\eta=5\times10^3$ Centipoise to about $\eta=5\times10^5$ Centipoise, the target viscosity for the media are attained with abrasive particle loadings of from about 60 to about 90, preferably about 75 to 85 weight percent of the medium.

There are a number of attributes of the present invention which are comparable or identical to abrasive flow machining, as those in the art will recognize. The differences are significant and important, however.

In abrasive flow machining, including orbital abrasive flow machining it is a primary objective to obtain solid or quasi-solid plug flow of the media across the work piece surface, and flow, whether plastic or plug flow, is the dominant mode of action. No or substantially no elastic deformation of the media is wanted or produced. The strain rates applied to the media are limited to levels which produce the desired flow characteristics, in contrast to the present invention where the strain rates are sufficient to produce a substantial and predominant level of elastic deformation in the media, while flow is purposely minimized (but not eliminated; some flow is required to assure circulation and turnover the abrasive particles at the media-work piece surface interface). As a result of this different mode of action, the polishing effects on the surface of the work piece are maximized in the present invention.

Abrasive flow machining and orbital abrasive flow machining produce a surface with a distinct lay corresponding to the flow patterns of the media. In the present invention, there is little or no lay to the polished surface of the work piece. The patterns of the flow which do occur within the present invention are typically random, or very nearly so, because the media is not confined and is free to move in any direction dictated by the fluid dynamics of the system.

As those of ordinary skill in the art will further recognize, the present invention shares some characteristics which are common to lapping operations. There are important distinctions, however.

First and foremost, the present invention is far less dependent on the particle size of the abrasive to attain a specific level of finish. The surface finish in lapping is a direct function of particle size and processing time. In the present invention, the surface finish is reduced by about one order of magnitude for a given abrasive particle size. While the improvement is not fully characterized, and we have no wish to be bound by any theoretical hypotheses, it appears that the improved surface finish is related to the high speed and to the resiliency of the abrasive medium, which both serve to limit the depth of cutting of each abrasive particle in contact with the work piece surface. In lapping, by contrast, the abrasive particles are directly and mechanically driven across the work piece surface, maximizing the depth of cut for the particular p article size.

In addition, the present invention is free of lay in the working pattern on the work piece surface. Lapping typically produces a surface lay representative of the pattern of motion of the tool which drives the abrasive particles. Indeed, the lay produced in lapping is often employed to develop ornamental patterns on work piece surfaces. In the present invention, we believe, although again we have no wish to be bound thereby, that the combination of resilience in the abrasive medium, the plastic flow of the medium and the lack of any bridging between the work piece and any other element in the system result in random or quasi-random working motions of the particles across the work piece surface, precluding the development of any significant lay or patterning on the surface and operating to remove patterns or lay in the surface as introduced by prior operations. Bridging is, of course, a primary feature of lapping operations.

EXAMPLE 1

The $R_a$ apparatus illustrated in FIG. 1 was employed to polish a plurality of coinage dies forged of tool steel and engraved with a design, and having a surface roughness as received of 25 micro-inches, $R_a$. The design was masked by filling with an epoxy resin, and the remaining surfaces of the dies were polished first for twelve minutes using a poly (borosiloxane) based media filled with 25 mm boron carbide abrasive, followed by a sixteen minute polishing operation with a second media formulation of the poly(boro-siloxane) filled with 2 $\mu$m diamond abrasive. No displacer was employed. The apparatus employed an orbital motion having an eccentricity of 0.2 inch at an orbit rate of 25 Hz. The unmasked areas of the dies were measured to have a surface roughness as finished of 0.2 micro-inches $R_a$.

EXAMPLE 2

The apparatus illustrated in FIG. 1 was also employed to polish a plurality of forged aluminum components of having a three-dimensionally complex shape. The components as received had a surface roughness of 100 to 120 micro-inches $R_a$. The apparatus was fitted with a displacer shaped as a complement of the shape of the components and providing a gap of 6 millimeters. The surface of the wheels were polished for 3.5 minutes, employing an orbit of 0.25 inch at a frequency of 17 Hz, employing poly(boro-siloxane) media and an 80 mesh abrasive, followed by a second polishing of 2 minutes, into employing an orbit of 0.25 inch at a frequency of 17 Hz, employing poly(boro-siloxane) media and a 220 mesh abrasive. The surfaces of the wheels were measured to have a surface roughness ranging from 20 to 25 micro-inches $R_a$ as finished.

EXAMPLE 3

The apparatus illustrated in FIG. 1 was also employed to polish a plurality of cast aluminum automotive wheels having a complex shape. The wheels as received had a surface roughness of 140 to 175 micro-inches $R_a$. The apparatus was fitted with a displacer shaped as a complement of the shape of the wheels and providing a gap of 6 millimeters. The surface of the wheels were polished for 3.5 minutes, employing an orbit of 0.25 inch at a frequency of 17 Hz, employing poly(boro-siloxane) media and an 80 mesh abrasive, followed by a second polishing for 1.5 minutes, employing an orbit of 0.25 inch at a frequency of 17 Hz, employing poly(boro-siloxane) media and a 220 mesh abrasive. The surfaces of the wheels were measured to have a surface roughness ranging from 20 to 25 micro-inches $R_a$ as finished.

The invention has been described herein with regard to particular preferred operating circumstances and requirements, and in a particular context. Those of ordinary skill will clearly understand the application of the invention and its uses in other diverse circumstances and will, with the guidance provided herein, be able to adapt the invention to the particular requirements of other contexts of practice of the invention.

The foregoing description and disclosure of the present invention is intended to be illustrative for the guidance of those of ordinary skill in the art to which the invention pertains, and is not intended to define or limit the scope of the invention. The scope of the invention is defined and limited only in the following claims.

What is claimed is:

1. A rheopectic abrasive visco-elastic medium composition for abrasive working of a work piece comprising: A. a visco-elastic poly(boro-siloxane) polymer carrier having a static viscosity of from about $\eta=5\times10^3$ Centipoise to about $\eta=5\times10^5$ Centipoise; B. a particulate abrasive; C. an optional inert filler in an amount of up to about 25% by weight of said medium; an optional plasticizing lubricant for said visco-elastic polymer in an amount of up to about 25% by weight of said medium; E. said medium having a static viscosity of from about $\eta=2\times10^4$ Centipoise to about $\eta=8\times10^6$ Centipoise, said medium containing a total volume of said particulate abrasive and of said inert filler less than a critical particulate solids volume concentration of said medium; and F. the resulting visco-elastic abrasive medium having from 50% to about 99% of the deflection by elastic deformation, and 1 to 50% of the deflection of the medium by fluid or plastic flow, when subjected to applied strain rates greater than about 2.5 sec$^{-1}$.

2. The medium composition of claim 1 wherein said particulate abrasive comprises material selected from the group consisting of alumina, silica, garnet, silicon carbide, diamond, tungsten carbide and mixtures thereof.

3. The medium composition of claim 1 wherein said particulate abrasive further comprises particles which range from about 1 to about 2000 micrometers in their greatest dimension.

* * * * *

UNITED STATES PATENT AND TRADEMARK OFFICE
CERTIFICATE OF CORRECTION

PATENT NO. : 6,918,937 B2
DATED : July 19, 2005
INVENTOR(S) : Gilmore et al.

It is certified that error appears in the above-identified patent and that said Letters Patent is hereby corrected as shown below:

Column 5,
Line 1, "is an illustrates" should read -- is an illustration --.
Line 3, "selected area" should read -- selected areas --.

Column 15,
Line 22, "simpler and demanding" should read -- simpler and less demanding --.

Column 19,
Line 5, "relative notion drive" should read -- relative motion drive --.

Column 21,
Line 4, "silica, gamet" should read -- silica, garnet --.

Column 23,
Line 23, "p article size" should read -- particle size --.

Column 24,
Line 47, "said medium; an" should read -- said medium; D. an --.

Signed and Sealed this

Twenty-first Day of March, 2006

JON W. DUDAS
*Director of the United States Patent and Trademark Office*